(12) United States Patent
Everett et al.

(10) Patent No.: US 9,031,714 B1
(45) Date of Patent: May 12, 2015

(54) COMMAND AND CONTROL SYSTEM FOR INTEGRATED HUMAN-CANINE-ROBOT INTERACTION

(71) Applicants: Hobart R. Everett, San Diego, CA (US); Lisa Albuquerque, Dumfries, VA (US); Paul Scerri, Pittsburgh, PA (US); Gregory T. Kogut, San Diego, CA (US); Darren N. Powell, San Diego, CA (US)

(72) Inventors: Hobart R. Everett, San Diego, CA (US); Lisa Albuquerque, Dumfries, VA (US); Paul Scerri, Pittsburgh, PA (US); Gregory T. Kogut, San Diego, CA (US); Darren N. Powell, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 288 days.

(21) Appl. No.: 13/753,614

(22) Filed: Jan. 30, 2013

(51) Int. Cl.
*F41H 11/16* (2011.01)

(52) U.S. Cl.
CPC ............... *F41H 11/16* (2013.01); *Y10S 901/01* (2013.01)

(58) Field of Classification Search
USPC ............... 701/1, 2, 22, 23, 24, 25, 26, 28, 36, 701/400, 408, 409, 410, 416, 418, 420, 423, 701/425, 426, 428, 429, 431, 436, 454, 457, 701/459, 467, 468, 519, 538, 300; 340/901, 340/988, 989, 990, 995.1, 995.19, 995.24, 340/995.5, 438, 439; 901/1; 700/245, 250
See application file for complete search history.

(56) References Cited

U.S. PATENT DOCUMENTS

| | | | |
|---|---|---|---|
| 5,307,271 A | 4/1994 | Everett | |
| 6,382,070 B1* | 5/2002 | Garcia et al. | 89/1.13 |
| 2003/0025792 A1* | 2/2003 | Eberhard | 348/143 |
| 2003/0199944 A1* | 10/2003 | Chapin et al. | 607/48 |
| 2006/0011146 A1* | 1/2006 | Kates | 119/719 |
| 2008/0036610 A1 | 2/2008 | Hokuf | |
| 2008/0163671 A1* | 7/2008 | Dugan | 73/23.34 |
| 2009/0044761 A1* | 2/2009 | Chapin et al. | 119/720 |
| 2012/0111285 A1* | 5/2012 | Pearce et al. | 119/712 |
| 2012/0185115 A1* | 7/2012 | Dean | 701/2 |
| 2012/0312247 A1* | 12/2012 | Ebersole | 119/712 |
| 2013/0307989 A1* | 11/2013 | Stone et al. | 348/159 |
| 2013/0312043 A1* | 11/2013 | Stone et al. | 725/62 |
| 2014/0062754 A1* | 3/2014 | Mohamadi | 342/22 |

OTHER PUBLICATIONS

Non-published patent application entitled "System and Method for Displaying Data from Multiple Devices on a Single User Interface", U.S. Appl. No. 13/449,499, filed Apr. 18, 2012, Gilbreath, Gary et al.

* cited by examiner

*Primary Examiner* — Thomas Tarcza
*Assistant Examiner* — Edward Pipala
(74) *Attorney, Agent, or Firm* — SPAWAR Systems Center Pacific; Kyle Eppele; Stephen E. Baldwin

(57) ABSTRACT

A control system for integrated human-trained animal-robot interaction comprising: an operator control unit linked to receive trained animal detection information representative of locations of detected IEDs (Improvised Explosive Devices), the operator control unit further linked to one or more unmanned robotic vehicles for providing control information to a selected robotic vehicle, the control information including an optimal path leading the selected robotic vehicle to a detected IED in order for the selected robotic vehicle to neutralize the detected IED.

15 Claims, 4 Drawing Sheets

COMMAND AND CONTROL SYSTEM FOR INTEGRATED HUMAN-CANINE-ROBOT INTERACTION

FEDERALLY-SPONSORED RESEARCH AND DEVELOPMENT

This invention (Navy Case NC 101,887) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil.

CROSS-REFERENCE TO RELATED PATENT APPLICATIONS

This application is related to application Ser. No. 13/449,499, filed Apr. 18, 2012, entitled "System and Method for Displaying Data from Multiple Devices on a Single User Interface" (NC 100,810), which is assigned to the same assignee as the present application and the details of which are hereby incorporated by reference herein.

BACKGROUND OF THE INVENTION

Current EOD (Explosive Ordnance Disposal) robotic systems rely upon a human operator for video-based "joystick" guidance towards suspected IEDs, which are first identified through visual indicators, lightweight metal detectors, trained IED Defeat Dogs, or mechanical means. Drawbacks to this current teleoperated control strategy, which was extensively used on the unmanned systems of WWII, include operator fatigue, mission failure in the event of lost communications, and dangerously impaired battlefield situational awareness on the part of the operator. As a result, the current concept of operations typically requires three Warfighters for a single robot going downrange, when it should be the other way around. The recent shift in military focus from the relatively flat and reasonably structured urban environments of Iraq to the more rugged and remote regions of Afghanistan has only exacerbated the problem.

Some work has already been done by the Unmanned Systems Group at SSC Pacific to add intelligent navigation to the existing EOD Man-Transportable Robotic Systems (MTRS) in order to reduce the driving burden imposed upon the operator. In response to a recent Joint Urgent Operational Need Statement (JUONS), for example, an autonomous "retro-traverse" behavior was developed for NAVEODTECHDIV, which allows the robot to automatically return unassisted to its point of origin when the mission is over, avoiding any obstacles en route. There are two primary limitations to these existing capabilities: 1) the simplified 2-D representation of the robot's environment restricts operation to reasonably level terrain; and 2) any objects detected by the collision-avoidance system are treated as insurmountable obstacles, which over constrains mobility (e.g., the robot gets stopped by tall grass).

The Next-Generation EOD Robot Program managed by NAVEODTECHDIV for PMS-EOD at the Naval Sea Systems Command has selected the Multi-robot Operator Control Unit (MOCU) developed by the Unmanned Systems Group at SSC Pacific as its robotic controller. MOCU was designed from the ground-up to be modular and scalable so it could be used to control both existing and future platforms. The modularity has been extended to the user interface as well, making it possible to create the full gamut of user interfaces ranging from headless to tiled windows to completely immersive game-like displays.

While the MOCU modules are used primarily for interfacing to different protocols (specialized hardware, video decoding and the like), most of the user interface is defined in XML configuration files, making it relatively easy to customize what the display looks like and how the user interacts with the system, whether this be via mouse, keyboard, touchscreen, joystick, or other such input devices. See, for example, the above cross-referenced application entitled "System and Method for Displaying Data from Multiple Devices on a Single User Interface" (Navy Case NC 100,810).

The original purpose of MOCU development was to provide a single control station compatible with multiple EOD robotic platforms, with a common look and feel to expedite training and eliminate the need to procure and logistically support proprietary platform-specific controllers from the various robot manufacturers. MOCU was later expanded by the Unmanned Systems Group to provide integrated control of additional types of unmanned systems besides UGVs, such as UAVs, USVs, and UUVs operating across all domains of air, land, and sea. The purpose of this invention is to further expand MOCU to provide a suitable operator interface to a working animal, as for example an EOD Dog.

SUMMARY OF THE INVENTION

A control system for integrated human-trained animal-robot interaction comprising: an operator control unit linked to receive trained animal detection information representative of locations of detected IEDs (Improvised Explosive Devices), the operator control unit further linked to one or more unmanned robotic vehicles for providing control information to a selected robotic vehicle, the control information including an optimal path leading the selected robotic vehicle to a detected IED in order for the selected robotic vehicle to neutralize the detected IED.

BRIEF DESCRIPTION OF THE DRAWINGS

The invention will be more fully described in connection with the annexed drawings, where like reference numerals designate like components, in which.

DETAILED DESCRIPTION OF THE EMBODIMENTS

Figure 1:
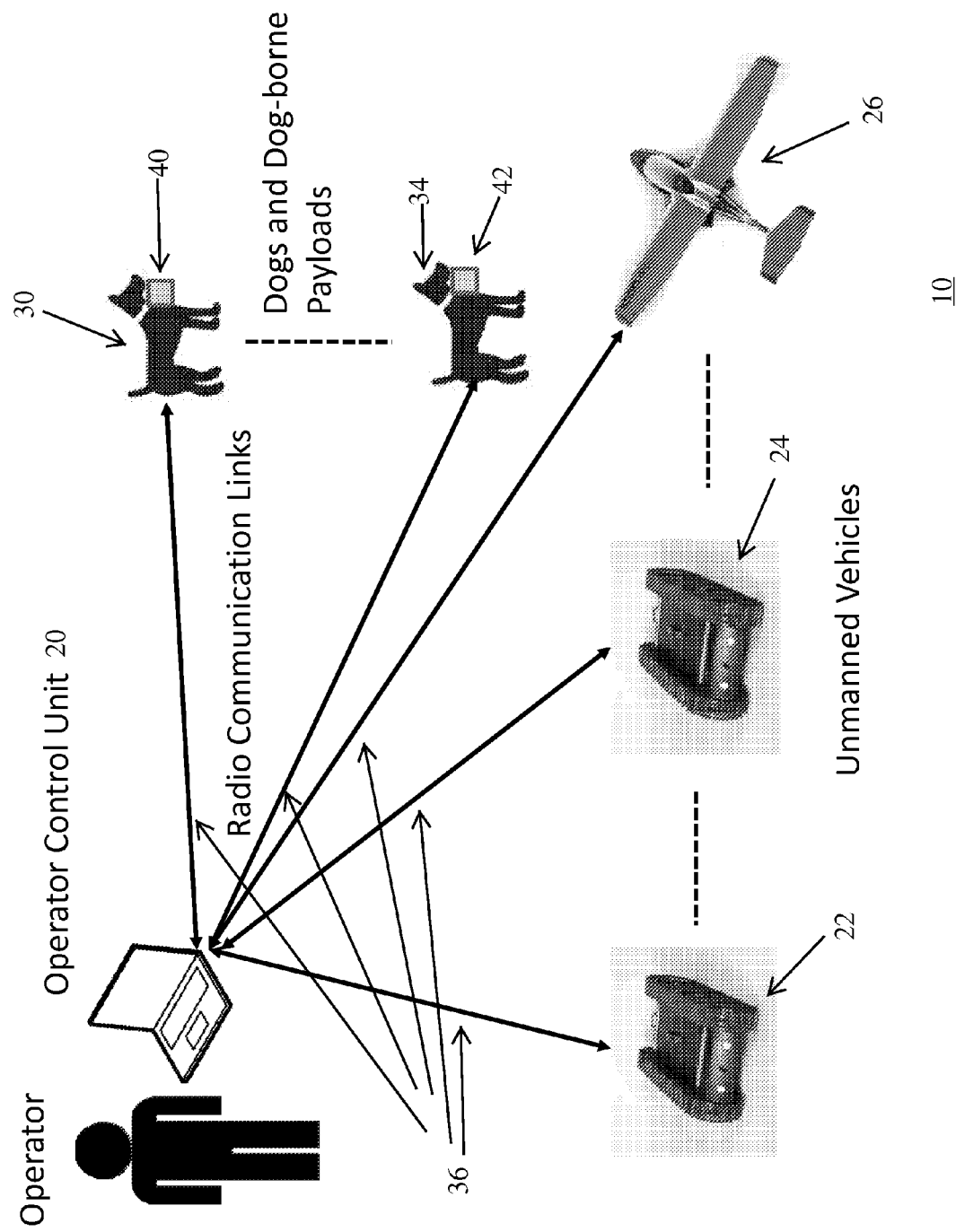
FIG. 1 shows a block diagram of one embodiment of a command and control system for integrated human-canine-robot interaction.

One purpose of this invention is to improve the efficiency and effectiveness of human-operator interaction with a variety of unmanned systems (as for example UGVs, UAVs, USVs, UUVs) that are operating in conjunction with a variety of trained animals (as for example dogs or dolphins) UGV is the acronym for "unmanned ground vehicle"; UAV is "unmanned aerial vehicle"; USV is "unmanned surface vehicle"; and UUV is "unmanned underwater vehicle".

For purposes of illustration, the system can be used to integrate the current DoD method of IED detection using EOD Dogs with the current means of IED neutralization using EOD robots, while simultaneously reducing the control burden imposed upon the EOD operator.

The following specific issues are addressed by the integrated design:

A direct interface between the specially-trained semi-autonomous EOD Dog (EODD) and the EOD robotic controller to automatically capture and display the geographic locations of potential IEDs detected by the dog on the map display of the robot's world model.

An a priori traversibility assessment algorithm to extract data from all possible sources (overhead imagery, terrain elevation database, EODD inertial feedback) for optimal path planning.

An automatic means to plan an appropriate path from the current location of the robot to the suspected IED site of interest.

Real-time terrain-traversibility assessment of this route, based on inertial and/or video feedback from the dog vest or collar, to help ensure the chosen path is executable by the robot.

Another purpose of this invention is to further extend the scope of integrated control to incorporate date from and direct the actions of trained working animals, such as EOD dogs, search-and-rescue (SAR) dogs, or marine mammals.

EOD Dog

The EOD community, which includes "detect" as one of their missions, does not currently have a robust reliable stand-off-detection capability while on dismounted patrol. The initial decision not to use dogs for that purpose was made prior to Operation Iraqui Freedom (OIF) and Operation Enduring Freedom (OEF), based on perceived limitations and support requirements for dogs paired with the traditional EOD role of being the "on call" expert who came to the scene only after a possible explosive was identified through other means.

The IED-Detector EOD Dog has successfully challenged many of the traditional limitations (such as limited search time) and support requirements (such as a need for air-conditioning). The CIED mission in OIF/OEF and the sheer numbers of IEDs at a given location have resulted in the routine use of EOD personnel in dismounted high-threat environments. The first nine IED-Detector EOD Dogs passed stateside proof of concept and were deployed for operational evaluation in June 2007. The USMC currently has 603 dogs trained using the protocols.

A wide array of remote-control dog training collars currently exist that employ a combination of adverse stimulus (shock) and tones to shape and reinforce behavior.

There are also many commercial collars that contain GPS devices for the specific purpose of locating dogs, with the most advanced version provided by Garmin. By way of example, the Garmin Astro provides position updates every 5, 10, 30 or 120 seconds, includes a sensor that identifies the animal's posture (i.e. running, sitting or on point) and can track up to ten dogs at a distance of up to 9 miles (terrain dependent). See online description at: http://sites.garmin.com/astro/.

The US military recently introduced a special camera system that can be incorporated into vests designed to be worn by combat dogs to provide real-time video to the dog handler via a handheld viewer/recorder with a 3-inch screen. The camouflaged vest weighs 20 ounces and the camera weighs 11 ounces. The camera has night vision and the batteries on the camera and viewer last for 30 minutes. The range of the camera/viewer data link is 1,000 meters in the open, or 200 meters in an occluded environment.

This remote viewing capability enables the Warfighter to send a dog into a building or cave and see what the dog sees. The vests also include a small loudspeaker that enables the handler to give the dog commands. Note the similarity to the same mission executed by a robot instead of a dog. The robot's exploration inside the structure of interest can be remotely controlled via radio commands based on the operator's interpretation of the remote video feed. This proposed integrated command and control system would allow the EOD operator to effectively employ both remote resources (e.g., the EOD Robot and the EOD Dog), graphically portraying their respective locations in a common operating picture.

Similarly, an alternative application may pair one or more free-ranging search and rescue dogs, the respective locations of which are graphically depicted on the MOCU display, along with status information that signals when a particular dog has detected a human victim or survivor. The UAV circling overhead could then be automatically directed to overfly the area and visually investigate the find. The MOCU operator could make the final call (i.e., is it a valid find or a false alarm) and then advise both assets as to their next tasking.

FIG. 1 shows a block diagram of one embodiment of a command and control system 10 for integrated human-canine-robot interaction. In FIG. 1 an operator controls an operator control unit (OCU) 20 which has radio communication links 36 with various deployed assets, including unmanned vehicles UGV 22, 24 and UAV 26, and trained canines 30, 34. The trained canines 30, 34 each have suitable control collars or vests 40, 42, which are shown in more detail in FIG. 2.

Other embodiments of the system shown in FIG. 1 are possible, such as a marine environment, where trained animals (such as dolphins, seals or whales) operate in an underwater environment along with unmanned vehicles (such as UUVs, UAVs, or USVs) in a manner similar to the system shown in FIG. 1.

Figure 2:
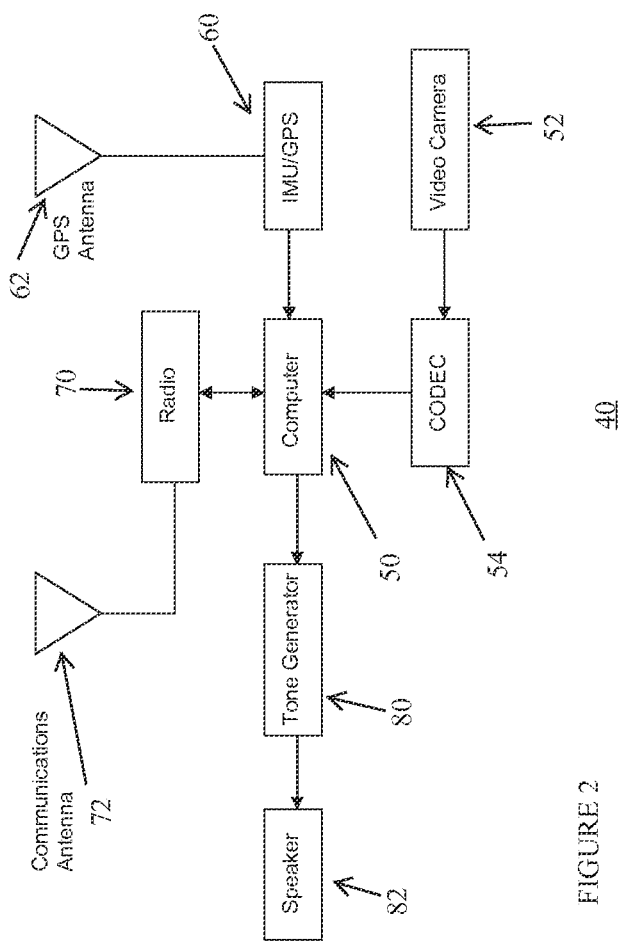
FIG. 2 shows a block diagram of a suitable collar or vest which could be utilized with a trained canine as shown in FIG. 1.

FIG. 2 shows a block diagram of a suitable collar 40 which could be utilized with a trained canine as shown in FIG. 1. The collar 40 provides real-time canine detection information to the OCU 20, including GPS location information at any particular moment in time, and information regarding the particular surrounding terrain.

The collar configuration shown in FIG. 2 includes a computer 50 which receives video camera information from video camera 52 via codec 54. The video information could include information representative of the surrounding terrain. Computer 50 also receives GPS information from IMU/GPS (Inertial Measurement Unit/Global Positioning System) unit 60 and GPS antenna 62. The GPS information is calculated from radio signals received from the GPS satellite constellation, as is well known to those familiar with the art.

Computer 50 also communicates with the OCU 20 of FIG. 1 via radio 70 and communications antenna 72. Computer 50 also provides audio instructions to the trained canines 30, 34 of FIG. 1 via a tone generator 80 and speaker 82.

Figure 3:
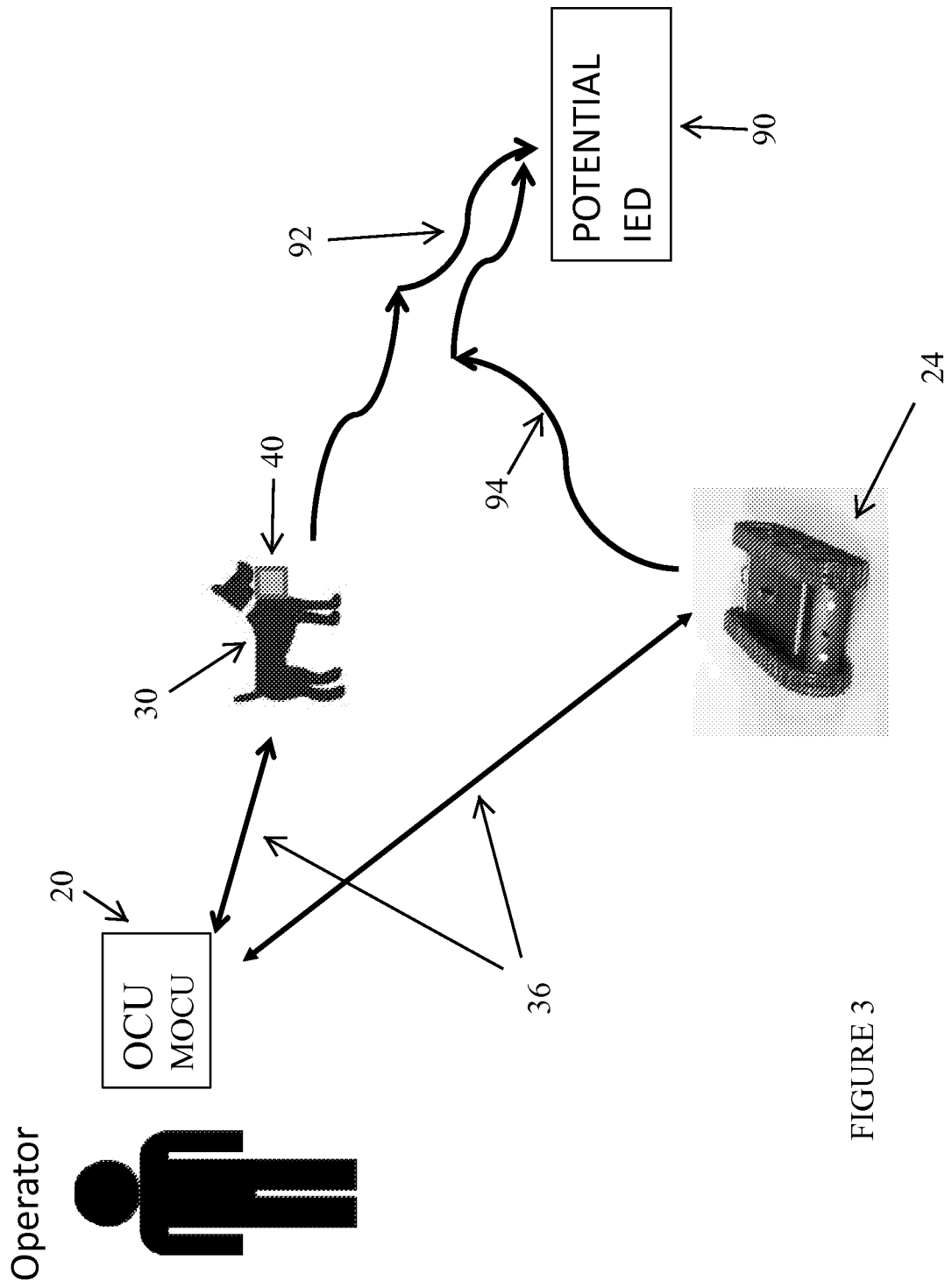
FIG. 3 shows an embodiment in which the system of FIG. 1 provides a combined MOCU interface to both a canine and a robot to detect and neutralize a potential IED.

FIG. 3 shows an embodiment in which the system 10 utilizes MOCU-controlled canine-robot interaction to detect and neutralize a potential IED. In FIG. 3, a trained canine 30 detects a potential IED 90 while traversing path 92. The collar configuration 40 provides a communication link 36 to OCU 20.

MOCU can then communicate with a robotic vehicle 24 (a UGV in this case) to provide an optimal path 94 for robotic vehicle 24 to approach the potential IED 90 and neutralize the IED 90. This optimal robot path can be automatically generated by the MOCU path planner or manually created or directed by the EOD operator.

Figure 4:
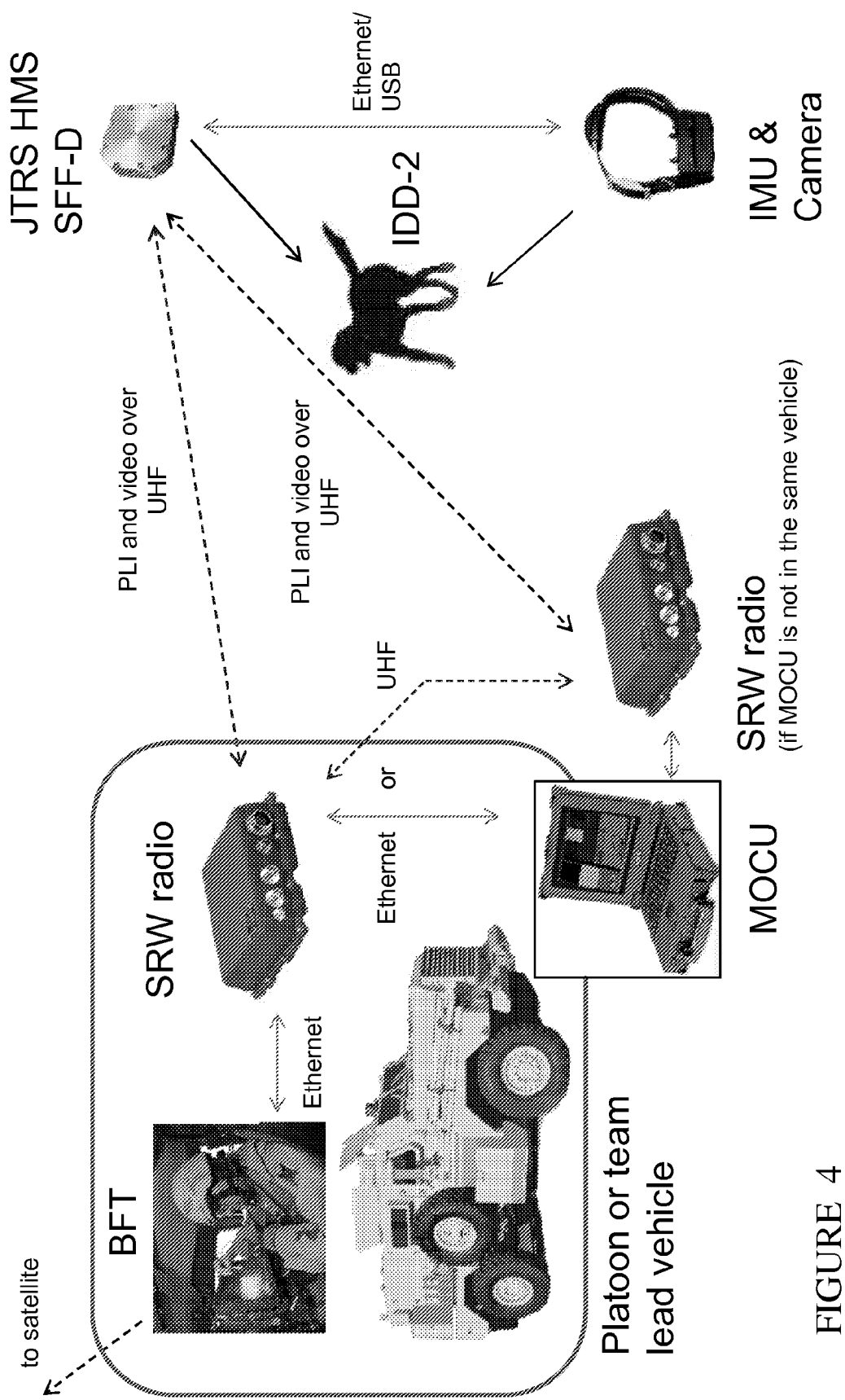
FIG. 4 shows another embodiment of a command and control system.

FIG. 4 shows another embodiment of a control system which might have applications in a military environment.

The control system of FIG. 4 can automatically buffer dog attitude, location, and video on significant events; automatically notify MOCU of significant events; retrieve past data and video on demand; and provide auditory control of dog from MOCU The control system of FIG. 4 includes a Joint Tactical Radio System (JTRS) Handheld, Manpack and Small Form Fit (HMS) Small Form Fit (SFF)-D radio with:

Soldier Radio Waveform (SRW) network radio built for unmanned systems, currently being rolled out.

Built-in GPS and automatically transmits position/location information (PLI) in Variable Message Format (VMF) understood by all tactical network radios and Blue Force Tracker (BFT) devices.

The platoon/team lead vehicle of FIG. 4:

Can have BFT and SRW radios.

If MOCU device is in the vehicle, it can communicate with the SRW radio via Ethernet.

If the MOCU is in another vehicle, it will communicate with the lead vehicle or directly with the IDD-2 (Interface Design Description-2) using the second vehicle's built-in SRW radio.

Dog attitude determination could be an IMU unit, or commercial devices (e.g., Garmin Astro).

The control system of FIG. 4 can:

Transmit data to MOCU and Blue Force Tracker (BFT)

Display dog attitude and location data on MOCU and BFT

Display live video from dog on MOCU on demand

The control system of FIGS. 1-4 can additional provide trained-animal detection information which includes inertial data representative of the surrounding terrain difficulty encountered in the operating environment.

As the canine traverses the environment, an attached inertial measurement device continuously records parameters describing the observed three-dimensional motion. Transmitted to the OCU, this data is used to estimate the degree of anticipated difficulty for by a ground robot trying to traverse the same area.

Vertical movements, jumps, and the number of turns are analyzed by the translation algorithm to quantify the perceived ruggedness of the terrain. Wherever the canine moved vertically, jumped, or made many turns over a short distance, the translation algorithm assumes a ground robot would encounter difficulty, whereupon the path-planning algorithm plans an alternate, safer path to the desired destination. Conversely, the algorithm infers easier terrain traversability for a ground robot if the canine moved smoothly and quickly with minimal vertical displacement.

The control system of FIGS. 1-4 can be utilized in other environments, such as searching to detect objects other than military objects. For instance, first responders in an emergency environment might be using a trained animals while searching to detect objects such as person(s) in distress where the surrounding terrain is especially rugged.

The robotic vehicle could then take an optimal path to reach the location of the detected person(s), or perhaps an alternate path, to provide rescue abilities, including delivery of emergency supplies. Other emergency applications of the control system should be apparent as well.

An exemplary concept of operations (conops) is as follows, as shown in FIGS. 1-3, in which:

A priori overhead imagery and Digital Terrain Elevation Data (DTED) are downloaded into the MOCU world model for mission-planning support.

An EOD Dog searches the area of interest, influenced as needed by operator cues (via for example by the MOCU-based OCU), detecting and recording potential IED threats.

The potential IED locations and geo-referenced inertial readings characterizing the associated terrain difficulty experienced by the dog during its search of the surrounding area are downloaded into MOCU for incorporation into the world model.

The subsequent MOCU-generated path leading the robot to the suspected IED location is displayed to the operator for approval.

The video-equipped EOD Dog is remotely piloted via ultrasonic tones to test this path, with the dog's track, inertial readings, and video feedback automatically displayed/recorded by the MOCU controller.

If deemed feasible, the operator approves or modifies the path for robot execution.

The robot executes the path to the reported IED location.

The exposed IED is manually neutralized by the operator in accordance with standard procedure.

The robot executes a retro-traverse behavior to the start point when directed.

Operational-performance improvements include:

More efficient execution of counter-IED robotic strategies due to direct MOCU interface to perceived IED locations as determined by the EOD Dog (EODD).

Significantly reduced operator workload/fatigue due to more intelligent robot navigation, achieved through optimized path planning and intelligent path execution.

More robust navigational performance of the robot due to intelligent pre-execution traversability analysis using the dog as a mobility surrogate.

Considerable IED-Defeat synergy is realized in that the dog can detect but not neutralize, whereas the robot can neutralize but not detect.

This combination provides a unique capability for merged IED-detect-and-defeat, with either element (i.e., robotic or canine) still able to perform separately as needed.

The fact that the canine-borne hardware can be readily interfaced to MOCU for display and dispatch purposes means no additional equipment is required by the EOD operator for downloading the suspected location data from the EOD Dog.

Features include:

A combined real-time IED detect-defeat system, consisting of an EOD dog and an EOD robot, both interfaced via RF (or alternative) communication links to a common operator control unit (OCU).

Ability to directly import to the OCU the GPS coordinates of canine-detected locations of potential IEDs.

Ability to directly import to the OCU position-stamped inertial measurements characterizing terrain difficulty as experienced by the dog.

Based on the above, the ability to generate at the OCU an optimal path for the robot leading to the suspected IED.

Ability to teleoperate the dog via acoustic tones transmitted from the OCU and emitted by the dog collar or harness.

Ability to conduct non-line-of-site teleoperation based on video-feedback provided by a camera on the dog collar or harness, said video coupled to the OCU via an RF link.

The components for the canine-borne system can be housed in a collar and/or a vest.

Additional sensors or other devices can be added to the dog collar or vest (e.g., chem-bio sensors, radiation sensors, RFID beacons).

The EOD Dog and EOD robot can be transported to the area of operations using vehicle-borne carriers attached to manned or unmanned equipment.

A similar integrated control concept can be applied to an overhead unmanned air vehicle (UAV) operating with a canine and/or a UGV.

A similar integrated control concept can be applied to an unmanned underwater vehicle (UUV) and/or unmanned surface vehicle (USV) operating with a trained dolphin or whale.

While detailed descriptions of one or more embodiments of the invention have been given above, various alternatives, modifications, and equivalents will be apparent to those skilled in the art without varying from the spirit of the invention. For example, the OCU-trained animal-robot interaction could be utilized in the detection of objects other than IEDs. Therefore, the above description should not be taken as limiting the scope of the invention, which is defined by the appended claims.

What is claimed is:

1. A control system for integrated human-canine-robot interaction comprising:
    an operator control unit linked to receive trained canine detection information representative of geographic locations of one or more potential IEDs (Improvised Explosive Devices) as detected by a trained canine and representative of the surrounding terrain difficulty of the geographic locations;
    the operator control unit further linked to an unmanned robotic vehicle for providing control instructions to the robotic vehicle, the control instructions including an optimal path leading the robotic vehicle to a detected IED in order for the robotic vehicle to neutralize the detected IED;
    further including a sensor collar or vest worn by the trained canine for only providing the detection information to the operator control unit without brain stimulation;
    wherein the trained animal detection information includes terrain information representative of the surrounding terrain difficulty of the geographic locations and wherein the trained-animal detection information includes inertial data representative of the surrounding terrain difficulty encountered in the operating environment.

2. The control system of claim 1 wherein the detection information includes GPS information.

3. The control system of claim 2 wherein the detection information includes video information.

4. The control system of claim 3 where in the operator control unit provides audio control instructions to the trained canine.

5. A control system for integrated human-trained animal-robot interaction comprising:
    an operator control unit linked to receive trained animal detection information representative of locations of detected IEDs (Improvised Explosive Devices);
    the operator control unit further linked to one or more unmanned robotic vehicles for providing control information to a selected robotic vehicle, the control information including an optimal path leading the selected robotic vehicle to a detected IED in order for the selected robotic vehicle to neutralize the detected IED;
    including a sensor collar or vest worn by the trained animal for only providing the detection information to the operator control unit without brain stimulation;
    wherein the trained animal detection information includes terrain information representative of the surrounding terrain difficulty of the geographic locations and wherein the trained-animal detection information includes inertial data representative of the surrounding terrain difficulty encountered in the operating environment.

6. The control system of claim 5 wherein the trained animal is a trained marine animal.

7. The control system of claim 5 wherein the trained animal is a trained canine.

8. The control system of claim 5 wherein the detection information includes GPS information.

9. The control system of claim 8 wherein the detection information includes video information.

10. The control system of claim 9 wherein the operator control unit provides audio control instructions to the trained animal.

11. The control system of claim 5 wherein the unmanned vehicle is an unmanned ground vehicle.

12. The control system of claim 5 wherein the unmanned vehicle is an unmanned aerial vehicle.

13. The control system of claim 5 wherein the unmanned vehicle is an unmanned surface vehicle.

14. The control system of claim 5 wherein the unmanned vehicle is an unmanned underwater vehicle.

15. A control system for integrated human-trained animal-robot interaction comprising:
    an operator control unit linked to receive trained animal detection information representative of locations of detected objects;
    the operator control unit further linked to one or more unmanned robotic vehicles for providing control information to a selected robotic vehicle, the control information including an optimal path leading the selected robotic vehicle to the detected object
    including a sensor collar or vest worn by the trained animal for only providing the detection information to the operator control unit without brain stimulation;
    wherein the trained animal detection information includes terrain information representative of the surrounding terrain difficulty of the geographic locations and wherein the trained-animal detection information includes inertial data representative of the surrounding terrain difficulty encountered in the operating environment and wherein the operator control unit provides alternate path information based on the terrain information.

* * * * *